(12) United States Patent
Hogden et al.

(10) Patent No.: US 6,678,658 B1
(45) Date of Patent: *Jan. 13, 2004

(54) SPEECH PROCESSING USING CONDITIONAL OBSERVABLE MAXIMUM LIKELIHOOD CONTINUITY MAPPING

(75) Inventors: John Hogden, Santa Fe, NM (US); David Nix, Stanford, CA (US)

(73) Assignee: The Regents of the University of California, Los Alamos, NM (US)

( * ) Notice: Subject to any disclaimer, the term of this patent is extended or adjusted under 35 U.S.C. 154(b) by 572 days.

This patent is subject to a terminal disclaimer.

(21) Appl. No.: 09/612,026

(22) Filed: Jul. 7, 2000

Related U.S. Application Data

(60) Provisional application No. 60/143,135, filed on Jul. 9, 1999.

(51) Int. Cl.[7] .............................................. G10L 15/06
(52) U.S. Cl. ........................ 704/243; 704/240; 704/245; 704/255
(58) Field of Search ................................ 704/240–245, 704/256, 255, 239, 251, 254, 238, 253, 258, 222, 220

(56) References Cited

U.S. PATENT DOCUMENTS

| | | | | |
|---|---|---|---|---|
| 5,682,501 | A | * 10/1997 | Sharman | 704/260 |
| 5,719,996 | A | * 2/1998 | Chang et al. | 704/256 |
| 5,865,626 | A | * 2/1999 | Beattie et al. | 434/185 |
| 6,029,124 | A | * 2/2000 | Gillick et al. | 704/200 |
| 6,038,388 | A | * 3/2000 | Hogden et al. | 703/6 |
| 6,052,662 | A | 4/2000 | Hogden | 704/256 |
| 6,076,057 | A | * 6/2000 | Narayanan et al. | 704/256 |
| 6,092,044 | A | * 7/2000 | Baker et al. | 704/254 |
| 6,151,574 | A | * 11/2000 | Lee et al. | 704/256 |
| 6,151,575 | A | * 11/2000 | Newman et al. | 704/260 |
| 6,212,498 | B1 | * 4/2001 | Sherwood et al. | 704/244 |
| 6,256,607 | B1 | * 7/2001 | Digalakis et al. | 704/222 |
| 6,260,013 | B1 | * 7/2001 | Sejnoha | 704/240 |
| 6,263,309 | B1 | * 7/2001 | Nguyen et al. | 704/239 |
| 6,424,943 | B1 | * 7/2002 | Sherwood et al. | 704/244 |
| 6,466,908 | B1 | * 10/2002 | Baggenstoss | 704/256 |

OTHER PUBLICATIONS

Juergen Schroeter and Man Mohan Sondhi, "Techniques for Estimating Vocal–Tract Shapes from the Speech Signal," IEEE Transactions on Speech and Audio Processing, vol. 2, No. 1, Part II, Jan. 1994, pp. 133–150.

R. C. Rose, J. Schroeter, and M. M. Sondhi, "The Potential Role of Speech Production Models in Automatic Speech Recognition," J. Acoustical Society of America, vol. 99, No. 3, Mar. 1996, pp. 1609–1709.

Joseph S. Perkell, Marc H. Cohen, Mario A. Svirsky, Melanie L. Matthies, Inaki Garabieta, and Michael T. T. Jackson, "Electromagnetic Midsagittal Articulometer Systems for Transducing Speech Articulatory Movements," J. Acoustical Society of America, vol. 92, No. 6, Dec. 1992, pp. 3078–3096.

(List continued on next page.)

*Primary Examiner*—Vijay Chawan
(74) *Attorney, Agent, or Firm*—Ray G. Wilson

(57) ABSTRACT

A computer implemented method enables the recognition of speech and speech characteristics. Parameters are initialized of first probability density functions that map between the symbols in the vocabulary of one or more sequences of speech codes that represent speech sounds and a continuity map. Parameters are also initialized of second probability density functions that map between the elements in the vocabulary of one or more desired sequences of speech transcription symbols and the continuity map. The parameters of the probability density functions are then trained to maximize the probabilities of the desired sequences of speech-transcription symbols. A new sequence of speech codes is then input to the continuity map having the trained first and second probability function parameters. A smooth path is identified on the continuity map that has the maximum probability for the new sequence of speech codes. The probability of each speech transcription symbol for each input speech code can then be output.

6 Claims, 5 Drawing Sheets

OTHER PUBLICATIONS

Sharlene A. Liu, "Landmark Detection for Distinctive Featured–Based Speech Recognition," J. Acoustical Society of America, vol. 100, No. 5, Nov. 1996, pp. 3417–3430.

John Hogden, Anders Lofqvist, Vince Gracco, Igor Zlokarnik, Philip Rubin, and Elliot Saltzman, "Accurate Recovery of Articulator Positions from Acoustics: New conclusions Based on Human Data," J. Acoustical Society of America, vol. 100, No. 3, Sep. 1996, pp. 1819–1834.

Li Deng and Don X. Sun, "A Statistical Approach to Automatic Speech Recognition using the Atomic Speech Units Constructed From Overlapping Articulatory Features," J. Acoustical Society of America, vol. 95, No. 5, Part 1, May 1994, pp. 2702–2719.

Robert M. Gray, "Vector Quantization," IEEE ASSP Magazine, Apr. 1984, pp. 4–29.

John Hogden, "A Maximum Likelihood Approach To Estimating Articulator Positions From Speech Acoustics," LA–UR–96–3518, pp. 1–24.

\* cited by examiner

SPEECH PROCESSING USING CONDITIONAL OBSERVABLE MAXIMUM LIKELIHOOD CONTINUITY MAPPING

This application claims the benefit of U.S. Provisional Application Ser. No. 60/143,135, filed Jul. 9, 1999.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to speech processing, and, more particularly, to speech processing using maximum likelihood continuity mapping.

BACKGROUND OF THE INVENTION

While speech recognition systems are commercially available for limited domains, state-of-the-art systems have only about a 60%–65% word recognition rate on casual speech, e.g., telephone conversations, as opposed to speech produced by users who are familiar with and trying to be understood by a speech recognition system. Since speaking rates of 200 words per minute are not uncommon in casual speech, a 65% word recognition accuracy implies approximately 70 errors per minute—an unacceptably high rate for most applications. Furthermore, recognition performance is not improving rapidly. Improvements in word recognition accuracy of a few percent are considered "big" improvements, and recognition rates of the best systems on recorded telephone conversations have been generally stagnant in recent years.

Hidden Markov models (HMMs) are among the most popular tools for performing computer speech recognition (Rabiner & Juang, *An introduction to hidden Markov models, IEEE Acoustics. Speech, and Signal Processing Magazine* (1986). One of the primary reasons that HMMs typically out perform other speech recognition techniques is that the parameters used for recognition are determined by the data, not by preconceived notions of what the parameters should be. HMMs can then deal with intra- and inter-speaker variability despite a limited knowledge of how speech signals vary and despite an often limited ability to correctly formulate rules describing variability and invariance in speech. In fact, it is often the case that when HMM parameter values are constrained using (possibly inaccurate) Knowledge of speech, recognition performance decreases.

Nonetheless, many of the assumptions underlying HMM's are known to be inaccurate, and improving on these inaccurate assumptions within the HMM framework can be computationally expensive. Thus, various researchers have argued that, by using probabilistic models that more accurately embody the process of speech production, more accurate speech recognition should be achieved.

A prior art technique called Maximum Likelihood Continuity Mapping (MALCOM) provides a means of learning a more physiologically realistic stochastic model of speech as well as providing a method for speech processing once the stochastic model has been learned. See U.S. Pat. No. 6,052,662, issued Apr. 18, 2000, and incorporated herein by reference. The mapping learned by MALCOM is embodied in a continuity map, which is a continuous, multidimensional space over which probability density functions are positioned—where the probability density functions give the probability of a position in the space conditioned on an acoustic signal. The assumptions underlying MALCOM are well-founded. In fact, the main (and surprisingly powerful) assumption used by MALCOM is that articulator motions produced by muscle contractions have little energy above some low cut-off frequency, which is easily verified simply by calculating spectra of articulator paths.

MALCOM does not work directly on speech acoustics, but instead works on sequences of categorical data values, such as sequences of letters, words, or phonemes. The fact that MALCOM works on sequences of categorical data values is not a problem for processing digitized speech (a sequence of continuous valued amplitudes) because it is a simple matter to convert recorded speech to sequences of symbols using, e.g., Vector Quantization (VQ) (Gray, R., Vector *Quantization, IEEE Acoustics, Speech, and Signal Processing Magazine*, pp. 4–29 (1984). Unfortunately, MALCOM works with only one sequence at a time. This is a disadvantage when trying to apply MALCOM to problems such as speech recognition, in which relationships between tho time series (e.g. recorded speech sounds and phonetic labels) must be learned. In accordance with the present invention, MALCOM is modified to work with more than one observable sequence at a time to provide Conditional-Observable Maximum Likelihood Continuity Mapping (CO-MALCOM).

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention, as embodied and broadly described herein, is directed to a computer implemented method for the recognition of speech and speech characteristics. Parameters are initialized of first probability density functions that map between the symbols in the vocabulary of one or more sequences of speech codes that represent speech sounds and a continuity map. Parameters are also initialized of second probability density functions that map between the elements in the vocabulary of one or more desired sequences of speech transcription symbols and the continuity map. The parameters of the probability density functions are then trained to maximize the probabilities of the desired sequences of speech transcription symbols. A new sequence of speech codes is then input to the continuity map having the trained first and second probability function parameters. A smooth path is identified on the continuity map that has the maximum probability for the new sequence of speech codes. The probability of each speech transcription symbol for each input speech code can then be output.

BRIEF DESCRIPTION OF THE DRAWINGS

The accompanying drawings, which are incorporated in and form a part of the specification, illustrate exemplary speech processing according to the present invention.

DETAILED DESCRIPTION

Figure 1:
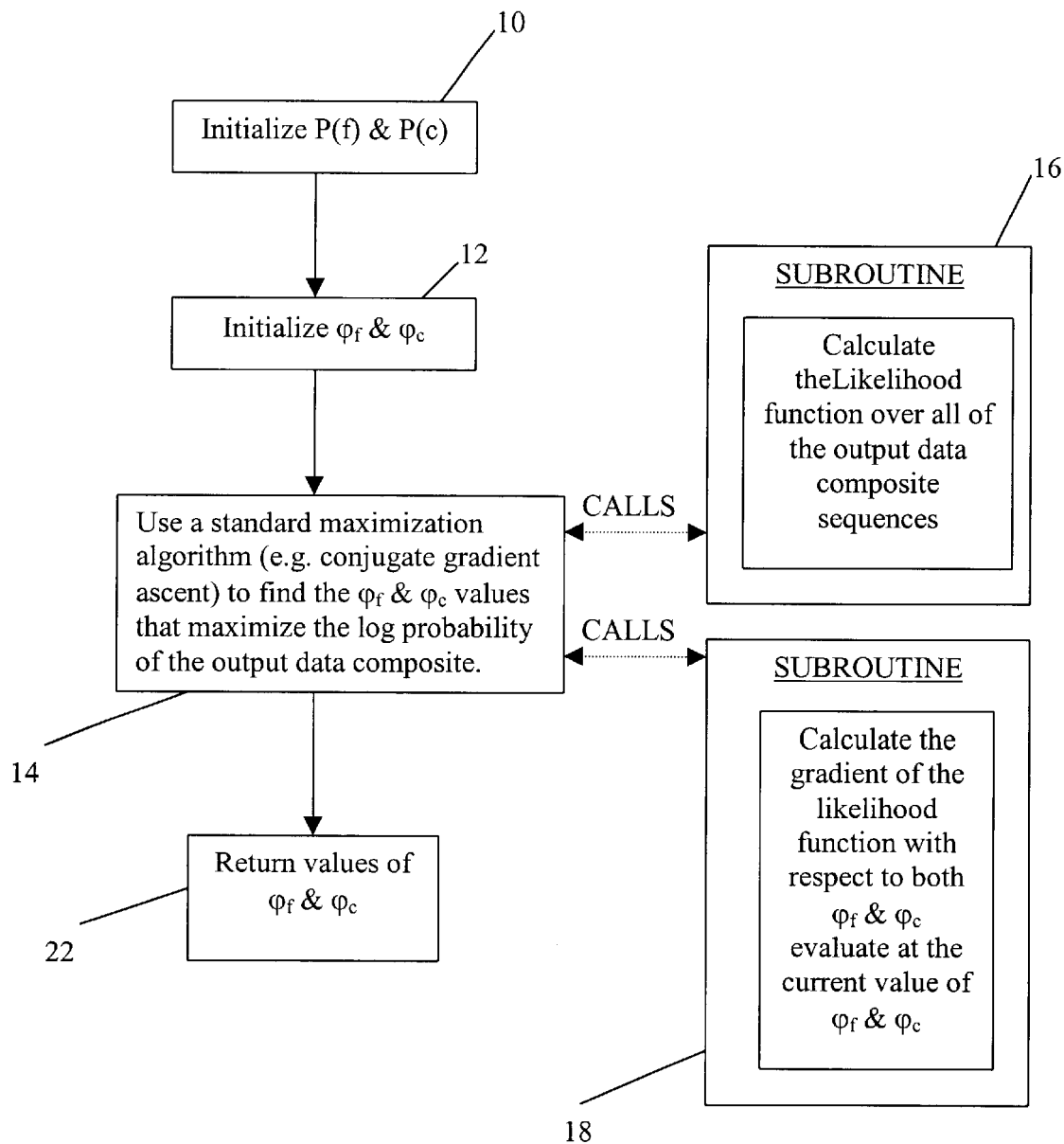
FIG. 1 is a flow diagram for training the process with input and output data composite sequences.

The task in computer speech recognition is to be able to speak into a computer microphone and have the computer type out the words or phonemes that were spoken. In essence, speech recognition is the processing of a speech signal in such a way that a transcription of the signal is produced.

Speech signals are typically thought of as time series, that is, there is some data describing the speech that occurs between time 0 and time 1, some information about the speech signal between time 1 and time 2, etc., until the end of the speech sequence is reached. The successive intervals of speech (the intervals between time 0 to 1, time 1 to 2, etc) are referred to as windows of speech.

If the data in each window of the acoustic speech signal are first converted to a discrete symbol such as a VQ code, then the process of speech recognition can be thought of as converting the sequence of VQ codes (representing speech acoustics) to phonemes, i.e., finding the most probable sequence of phonemes given a sequence of VQ codes. In the more general case, there may be more than one time-aligned sequence of symbols used as input, e.g., VQ codes representing acoustics and VQ codes representing video images of the mouth. Each of these sequences of symbols is referred to as a input data stream. For example, the sequence of VQ codes representing speech acoustics is an input data stream, and the sequence of VQ codes representing video images is a different input data stream. There may also be more than one set of sequences to output, e.g., a binary variable indicating whether a given segment of speech is voiced and a different binary variable indicating whether the speech segment in nasalized, etc. Each separate output sequence (e.g. the sequence of symbols representing voiced/unvoiced) will be referred to as an output data stream. In general, then, for each window there is a set of output symbols, which are called generally herein the output composite, or, more particularly, speech transcription symbols or word characteristics; and a set of input symbols, which are called generally herein the input composite, or, more particularly, speech codes or words.

The symbols used to construct a data stream are drawn from a set of symbols known as the vocabulary of the data stream. For example, suppose that one output data stream tells whether the speech is voiced or unvoiced. In this case, the vocabulary of the data stream is [voiced, unvoiced]. It is important to recognize the difference between the number of symbols in the vocabulary of a data stream (which, in this example, is 2) and the number of symbols in the data steam (which is the same as the number of windows).

The signal processing described herein builds on a prior art technique called Maximum Likelihood Continuity Mapping (MALCOM), above, which produces stochastic models of sequences (Hogden, 1998). Unlike MALCOM, the signal processing techniques described herein are capable of producing stochastic models of two or more simultaneously occurring sequences.

The technique described herein for estimating the probability of the output data composite assumes that the data are produced as an unobservable object moves through a multidimensional space called a continuity map (CM). The path of the object is assumed to be constrained in some way—typically it is assumed to have only low-frequency components and it is always assumed to be continuous. The probability of the output composite is assumed to be a stochastic function of the position of the unobservable object. Note that these assumptions model speech production, in which the unobservable articulators travel smoothly through space and the sound output in a particular window of speech is a stochastic function of the articulator positions. Thus, the paths through the continuity map that maximize the probability of the output data composite can be output as well as the probability of the output data composite.

The assumptions in the invention are similar to the assumptions of a hidden Markov Model (HMM). One can think of a position in the CM as being a state in the HMM and the probability of the output composite given the CM position as the ouput distribution of the state. However, the differences are very important. For example, the number of states in a CM is infinite as opposed to the finite number of states in an HMM. In addition, the Markov assumption in an HMM is replaced by a continuity assumption (which allows much more context to be used than a Markov assumption). Furthermore, the output probability of a data composite given a CM position is calculated very differently than in an HMM, as is described in more detail below, and as is required by the fact that a CM allows an infinite number of states.

The stochastic function that gives the probability of an output composite conditioned on a CM position is learned from training data sequences containing both input and output data composites. The stochastic function can then be used to evaluate new data sequences. Typically, on new sequences, the input data composite will be available but not the output data composite. In this case, the input data composite is used to infer the path of the unobservable object in the continuity map, and then the path is used to determine the probability of potential output data composites.

In accordance with the present invention, and assuming that the mapping between CM positions and the output data composites is known, a signal processing technique called Conditional-Observable MALCOM (CO-MALCOM) outputs, for each of N successive windows of speech, the probability of each output data composite given a path through the continuity map. It is also shown how to find the path through the continuity map that maximizes the probability of the output data composite assuming that the mapping between the output data composite and the CM is known. In addition, it is shown how to find the mapping between the output data composite and CM positions using training data.

Conditional-Observable Maximum Likelihood Continuity Mapping

The stochastic function that generates the probability of the output data composite given CM positions can be defined using relatively few parameters. The parameters consist of parameters of probability density functions (PDFs) over the CM. To be concrete, suppose that a speech recognition problem is being studied, and the goal is to get the probability of a phoneme given a CM position.

Using $p(x|f_i)$ to denote the distribution of positions x in the continuity map given the phoneme $f_i$, and, assuming conditional independence over time, the conditional probability that the phoneme f(t) at time t is $f_i$ is defined by:

$$P[f(t) = f_i \mid x(t)] = \frac{p[x(t) \mid f_i]P(f_i)}{\sum_j p[x(t) \mid f_j]P(f_j)}. \qquad \text{Eq. 1}$$

It can easily be verified that $P[f(t)=f_i|x(t)]$ is a probability that is always between 0 and 1 and the sum over i is 1. This equation, then, allows the probability of each phoneme for each window of acoustics, given a path through the continuity map, to be calculated. Note that the use of a capitol P indicates a probability (values are between 0 and 1 and sum to 1) as opposed to a lower case p which is used to indicate the height of a probability density function (values can be greater than 1 but the area under the curve is 1).

The parameters needed to calculate the phoneme probabilities are those parameters needed to specify the distributions of x conditioned on the phoneme, p(x|f), and the a priori probabilities of the phonemes P(f). If the PDFs are Gaussians, then each PDF is characterized by a mean and a covariance matrix. Note that the dependence on these parameters is implicitly assumed in the equations above, i.e., $p(x|f)=p(x|f,\phi_f)$ where $\phi_f$ is the set of parameters specifying the mapping between CM positions and all of the phonemes. Again assuming that p(x|f) is Gaussian for each phoneme, $\phi_f$ is a set of means and covariance matrices.

If there is more than 1 symbol in the output data composite, then the probabilities of the symbols conditioned on the CM position are multiplied, which gives the probability of the first signal AND the second symbol AND the third symbol, etc., assuming the signals are conditionally independent ("AND" is used in the probabilistic sense). That is, if the output composite for a window of speech consists of the symbols f' and f", then the probability of the output composite will be taken to be P(f'|x)P(f"|x).

A similar mapping is needed between the CM positions and the input data streams. This mapping is parameterized in the analogous way to the mapping for the output data streams—the a priori probabilities of symbols in the vocabulary of the input data stream are estimated, P(c), as are the parameters describing the probability density functions over the CM positions conditioned on the symbols in the input data stream, p(x|c). The full set of parameters that need to be estimated, $\phi$, comprises the parameters, $\phi_f$, that give the mapping between the output data composite symbols and the CM positions and the parameters, $\phi_c$, that give the mapping for the input data composite.

In CO-MALCOM, the parameters are chosen to maximize:

$$\hat{\varphi} = \underset{\varphi}{\arg\max} L\left(F, F', F'', \ldots, \hat{X}, \varphi_c, \varphi_f\right) \qquad \text{Eq. 2}$$

and $$L(F,F',F'', \ldots, \hat{X},\phi_c,\phi_f) = \log P(F,F'F'', \ldots |\hat{X}(C, C'',C'', \ldots ,\phi_c)\phi_f) \qquad \text{Eq. 3}$$

L is known as the likelihood function. In this equation, F and C are used to denote data streams, with F', F", C', C", etc indicating different output and input data streams.

Taken together, Equations 2 and 3 relate that the parameters of the mappings are chosen to maximize the log probability of the output composite sequence (which, incidentally, also maximizes the probability) conditioned on the parameters and the best smooth path. Equation 3 makes the statement that the input composite sequence, C,C',C", . . . , together with the mapping between the input composite and the CM, $\phi_c$, is used to get an estimated path through the CM, $\hat{X}(C,C',C'', \ldots ,\phi_c)$. The elements of $\hat{X}(C,C',C'', \ldots ,\phi_c)$ should be thought of as laid out in a matrix with the element in row t, column d, giving the path position on the dth CM dimension for window t. The element in row t column d is denoted $\hat{x}_{t,d}$. Equation 3 also relates that the estimated path, combined with the mapping between the output composite and the CM positions, gives the probability of the output composite sequence.

Note that the likelihood function can be easily calculated from the likelihood values of the individual output data streams:

$$L(F,F',F'', \ldots ,\hat{X},\phi_c,\phi_f)=L(F,\hat{X},\phi_c,\phi_f)+L(F',\hat{X},\phi_c,\phi_f)+ L(F'',\hat{X},\phi_c,\phi_f)+ \qquad \text{Eq. 4}$$

Because calculating the likelihood function is so simple given the likelihood values calculated for individual data streams, most of the description in this document will focus on individual data streams as opposed to data composite sequences.

To evaluate Equation 4, the definition of the probability of a whole sequence of output composites is needed. Assume conditional independence over time, and write:

$$P\left(F \mid \hat{X}(C, \varphi_c), \varphi_f\right) = \prod_t P(f(t) \mid \hat{x}(C, \varphi_c, t), \varphi_f) \qquad \text{Eq. 5}$$

where f(t) denotes the output composite for speech window t and $\hat{x}(C,\phi_c,t)$ is the CM position for window t. Note that $\hat{x}(C,\phi_c,t)$ is typically a function of the whole sequence of input data composites.

In order to find this maximum, how $\hat{X}(C,\phi_c)$ is calculated needs to be specified. For CO-MALCOM, use:

$$\hat{X}(C, C', C'', \ldots , \varphi_c) = \underset{X \in \text{smooth paths}}{\arg\max} \log P(X \mid C, C', C'', \ldots , \varphi_c), \qquad \text{Eq. 6}$$

which is to say that the path that is most probable given the input data composite sequence is chosen. Again, it is convenient to consider only one input data stream at a time since they can be easily combined by assuming conditional independence, i.e.:

$$\log P(X|C,C',C'', \ldots ,\phi_c)=\log P(X|C,\phi_c)+\log P(X|C',\phi_c)+ \qquad \text{Eq. 7}$$

Conditional independence over time is also assumed, giving:

$$P(X \mid C, \varphi_c) = \prod_t P(x(C, \varphi_c, t) \mid c(t), \varphi_c) \qquad \text{Eq. 8}$$

where c(t) is the input data composite for window t. Note that there is no "hat" above the X in this case, since it is used to represent any path, not necessarily the best smooth path.

As with MALCOM, the smoothing constraint may take on a variety of forms, but a particular constraint that has been found to be useful is the constraint that the path have no energy above some cut-off frequency. In fact, virtually any smoothness constraint that requires the path to lie on a hyperplane is easy to implement.

Solving for $\phi$ generally requires using a function maximization algorithm, such as conjugate gradient ascent. While many function optimization algorithms are generally available, maximization algorithms that are supplied with the gradient of the function with respect to the independent variables are typically much faster, so the gradient equations are given here. Let $\nabla_f$ indicate the gradient with respect to $\phi_f$.

As a first step toward getting the gradient equations, it is useful to write the likelihood function in this form:

$$L(F, \hat{X}, \varphi_c, \varphi_f) = \sum_t \log P[\hat{x}(C, \varphi_c, t) | f(t)] + \sum_t \log P \quad \text{Eq. 9}$$

$$[f(t)] - \sum_t \log \sum_i P[\hat{x}(C, \varphi_c, t)$$

$$| f_i ] P[f_i]$$

It is important to see that the difference between f(t) and $f_i$: f(t) is the symbol in the output data stream associated with window t, whereas $f_i$ is the ith symbol in the vocabulary of the data stream. That is, if the data stream has a vocabulary of 2, then i will be either 1 or 2. Note that this equation assumes one input data stream and one output data stream, but that, as already mentioned, it is easy to generalize this equation to deal with more data streams.

Learning the Output Data Symbol Probabilities

As already mentioned, to find the probability of an output data symbol given a path position, the a priori probability of each output data symbol, P(f), is needed. From work with MALCOM, the values P(f) that maximize the probability of the output data stream are simply the relative frequencies of the output data symbols. If the training data sequence has a vocabulary of [voiced, unvoiced] and "voiced" is in the data stream 10 times and "unvoiced" is in the data stream 30 times, then P(voiced)=0.25 and P(unvoiced)=0.75.

Learning the PDF Parameters

Let $\nabla_f$ indicate the gradient with respect to $\phi_f$. From previous work with MALCOM, $$\nabla_f L(F, \hat{X}, \varphi_c, \varphi_f) = \sum_t \frac{\nabla_f P[\hat{x}(C, \varphi_c, t) | f(t)]}{P[\hat{x}(C, \varphi_c, t) | f(t)]} - \quad \text{Eq. 10}$$

$$\sum_t \frac{\sum_i P[f_i] \nabla_f P[\hat{x}(C, \varphi_c, t) | f_i]}{\sum_i P[f_i] P[\hat{x}(C, \varphi_c, t) | f_i]}$$

which can be calculated for various PDFs.

In order to find the gradient of the likelihood with respect to $\phi_c$, $\nabla_c L(F,\hat{X},\phi_c,\phi_f)$, the chain rule of vector calculus is used. For a scalar y, which is a function of a matrix U (the elements of U are indicated by lower case u), which is in turn a function of a matrix V (the elements of which are indicated by lower case v), and using greek letters to denote the indices of the matrix elements, the chain rule can be written:

$$\frac{\partial y}{\partial v_{\alpha\beta}} = \sum_{\gamma\delta} \frac{\partial y}{\partial u_{\gamma\delta}} \frac{\partial u_{\gamma\delta}}{\partial v_{\alpha\beta}} \quad \text{Eq. 11}$$

Thus, if the gradient of the likelihood function with respect to the path is found, and the gradients of the path elements with respect to $\phi_c$ are found, then the gradient of the likelihood with respect to $\phi_c$ can be found. It is also useful to write out the equation for a special case of the chain rule that occurs when U=WV and W is another matrix. In this case, $$\frac{\partial y}{\partial V} = W' \frac{\partial y}{\partial U} \quad \text{Eq. 12}$$

The superscript t indicates the transpose in this case.

The gradient with respect to the best smooth path is already known from work on MALCOM. It can be written as:

$$\frac{\partial}{\partial x_{\tau\delta}} L(F, \hat{X}, \varphi_c, \varphi_f) = \sum_t \frac{\frac{\partial}{\partial x_{\tau\delta}} P[\hat{x}(C, \varphi_c, t) | f(t)]}{P[\hat{x}(C, \varphi_c, t) | f(t)]} - \quad \text{Eq. 13}$$

$$\sum_t \frac{\sum_i P[f_i] \frac{\partial}{\partial x_{\tau\delta}} P[\hat{x}(C, \varphi_c, t) | f_i]}{\sum_i P[f_i] P[\hat{x}(C, \varphi_c, t) | f_i]}$$

As seen in the MALCOM patent, this can be further evaluated when the PDF is specified. The derivative with respect to the path elements can be written in a matrix form in which the derivative with respect to the $[\tau,\delta]$ element of the path is the $[\tau,\delta]$ element in the matrix. This matrix of partial derivatives is denoted as $\nabla_x L$.

To use the chain rule, the partial derivatives of the elements of the path with respect to the elements of $\phi_c$ are also needed. In general, an estimate of the gradient of the path with respect to the components of $\phi_c$, can be obtained using numerical methods, i.e., change a component of $\phi_c$, calculate the new best smooth path, and calculate the change in the best smooth path. Then change the next element in $\phi_c$, and calculate the change in the best smooth path again, etc.

While the derivatives of very complex functions can be found using the numerical technique suggested in the preceding paragraph, most implementations of CO-MALCOM should use simple PDFs that allow the derivatives to be calculated analytically, thereby speeding up the computation tremendously. Consider the case where there is one symbol in each input composite (e.g. a VQ code representing acoustics) and one symbol in each output composite (e.g. a phoneme). Also let p(x|c) be a symmetric Gaussian (the covariance matrix is diagonal and all of the diagonal components have the same value) for all c, and let Gaussians for different c all have the same covariance matrix. Suppose also that paths are constrained to be smooth by projecting them onto a hyperplane, i.e., a path is smooth if and only if $$X(C,\phi_c) = SS^t X(C,\phi_c) \quad \text{Eq. 14}$$

where S is a matrix with fewer columns than rows, the number of rows is the same as the number of windows of data, the columns of S are mutually orthogonal, and all the columns of S have length 1. Note that the smoothing constraint typically used with MALCOM, that the path has no energy above some cut-off frequency after trend removal etc., can be put into this form. With these PDFs and this smoothness constraint, the best path can be found analytically, and the special case of the chain rule is used.

In the example discussed above, the equation for the log of the conditional probability of the path becomes:

$$\log P(X \mid C, \varphi_c) = \sum_t \log \frac{1}{(2\pi)^{D/2}|\sigma|^{1/2}} \exp\left\{-\frac{1}{2\sigma}[x_t - \mu(c(t))][x_t - \mu(c(t))]\right\} \quad \text{Eq. 15}$$

where D is the number of dimensions in the CM, $\mu(c(t))$ is the mean of the distribution associated with the input data stream symbol for window t (which is a column vector with as many dimensions as the CM), and $x_t$ is a column vector giving the path position at time t, and $\sigma$ is the value along the diagonal of a covariance matrix (since all the diagonals are the same over all covariance matrices). The main part of this equation is the standard equation for a multidimensional Gaussian. The first thing to notice about this equation is that the sequence of $x_t$ positions that maximize the equation does not change with the variance but does change with the mean values. Thus, the mapping between the input data stream symbols and the CM is parameterized by the mean vectors. The set of parameters as a matrix is written:

$$\varphi_c = \begin{bmatrix} \mu_{11} & \mu_{12} & \cdots & \mu_{1D} \\ \mu_{21} & \ddots & & \\ \vdots & & & \\ \mu_{n1} & & & \mu_{nD} \end{bmatrix}$$

where n is the number of symbols in the vocabulary of the input data stream. The sequence of means associated with the sequence of symbols in the input data stream can also be written as a matrix:

$$\phi_k = \begin{bmatrix} \mu_1[c(1)] & \mu_2[c(1)] & \cdots & \mu_D[c(1)] \\ \mu_1[c(2)] & \ddots & & \\ \vdots & & & \\ \mu_1[c(T)] & & & \mu_D[c(T)] \end{bmatrix}$$

where T is the number of windows of data. In fact, $\phi_k$ can be shown to be a linear function of $\phi_c$. A matrix, A, can be constructed with as many rows as there are rows in $\phi_k$ and as many columns as there are rows in $\phi_c$. Each row of A will have all entries be 0 except one, which will have the value of one. The entries are set to 0 or 1 based on this rule: if the input data stream symbol at time t is j, then the $j^{th}$ column of the row t of A will be 1. Then, $\phi_k = A\phi_c$. The best smooth path given the input data stream in this example is:

$$\hat{X}(C,\phi_c) = SS^t\phi_k = SS^t A\phi_c \quad \text{Eq. 16}$$

Applying the special case of the chain rule to combine Eq. 16 with Eq. 13 gives:

$$\nabla_c L(F,\hat{X},\phi_c,\phi_f) = A^t SS^t \nabla_x L \quad \text{Eq. 17}$$

which is relatively easy to calculate.

The Smoothness Constraint

As with MALCOM, the phrase "smoothness constraint" can be misleading. Some applications may require that the path has no low frequencies, or that the path lie on a conic section, or a vast number of other contraints.

Nonetheless, the easiest constraints to implement are constraints that the path lie on a hyperplane, as discussed above. Since this constraint is important it is worth discussing in more detail here.

The trend of a path can be written as a matrix, R, times the path, where $$R = \begin{bmatrix} 1 - \frac{0}{T-1} & 0 & \cdots & 0 & \frac{0}{T-1} \\ 1 - \frac{1}{T-1} & 0 & \cdots & 0 & \frac{1}{T-1} \\ \vdots & \vdots & & \vdots & \vdots \\ 1 - \frac{T-2}{T-1} & 0 & \cdots & 0 & \frac{T-2}{T-1} \\ 1 - \frac{T-1}{T-1} & 0 & \cdots & 0 & \frac{T-1}{T-1} \end{bmatrix}$$

Low-pass filtering can be considered as premultiplying a signal by a matrix, Q, where Q is formed by premultiplying a matrix that performs the discrete fourier transform operation by a diagonal matrix with zero values in the lower diagonal elements (the elements that correspond to high frequency components), and then premultiplying the result by a matrix that does the inverse discrete fourier transform. All the columns of Q should have length 1. With R and Q defined, the process of detrending, filtering, and then adding the trend back in by premultiplying by the matrix R+Q(1−R) can be performed. It turns out that premultiplying by this matrix is not the same as projecting onto a hyperplane because the columns of the matrix are not mutually orthogonal. In order to project on to the constraint space, S is formed by using Grahm-Schmidt orthogonalization on R+Q(1−R). By adding the last column of R to the first column of R, it is easy to see that the column space of R is spanned by a column vector of 1's and the last column of R. With this knowledge, it can be shown that S can be found, for this smoothing constraint, by simply appending the column vector, B/|B|, to the column space of the matrix Q to get S, where B is defined by:

$$B = \begin{bmatrix} 0 \\ 1 \\ 2 \\ \vdots \\ T-1 \end{bmatrix} - Q \begin{bmatrix} 0 \\ 1 \\ 2 \\ \vdots \\ T-1 \end{bmatrix}$$

Since B is formed by subtracting the low-pass components from a ramp function, B can be thought of as the high-pass components of a ramp function. Thus, the smoothing constraint used in this example can be implemented by multiplying a path by a matrix.

A Simple Extension

A simple way to generalize CO-MALCOM is to condition the probability of an output data stream on a function of the best smooth path instead of the best smooth path itself. This could be important because CO-MALCOM as described above makes the assumption that the probability of a phoneme at time t is conditionally independent of the path position at any other time. To the extent that the path positions recovered by CO-MALCOM approximate articulator positions, this assumption may not be valid. Consider that the probability that a person is in the process of making a /b/ at a particular time changes depending on the direction of motion of the articulators, not just the position of the articulators at a particular time. Studies of speech recognition based on articulator measurement also suggest that functions of the articulator trajectories (e.g. derivatives, second derivatives, etc) give more information about phoneme identity than articulator positions themselves.

So instead of finding the probability of a phoneme conditioned on a smooth path position, it may be advantageous to find the probability of a phoneme given the, e.g., derivative of the smooth path. Such an extension is easy to implement: it would only require that we find PDFs of $_{100}f$ over the range of the function of the smooth path instead of the continuity map. In such a case, the likelihood function would be slightly changed to:

$$L(F,F',F'', \ldots, \hat{X}, \phi_c, \phi_f) = \log P(F,F',F'', \ldots | G(\hat{X}(C,C',C'', \ldots, \phi_c))\phi_f)$$

where G indicates the function. Derivatives would have to be computed using an additional invocation of the chain rule, but, depending on G, the problem may not be significantly more difficult than CO-MALCOM. In particular, if the function amounts to premultiplying the smooth path by a matrix, then calculating the gradient with respect to $\phi_c$ would essentially require only an additional matrix multiplication. More complicated likelihood functions in which different output streams are conditioned on different functions of the path can also be accomodated.

CO-MALCOM Speech Processing

The results of CO-MALCOM processing can be used in a variety of ways. For example, given a sequence of phonemes, the most likely sequence of VQ codes might be found, and then the VQ codes can be used as part of a speech synthesis device. Similarly, such a system could be used for transmitting speech with fewer bits by converting VQ codes to phonemes using MO-MALCOM, transmitting the phonemes, and then using MO-MALCOM to convert the phonemes back to VQ codes. Work is also underway to use CO-MALCOM to infer characteristics of words (e.g. noun, verb, . . . ) from sequences of words.

It is instructive to see one example of how CO-MALCOM can be used for speech recognition. To do speech recognition, $p[f(t)=f_i|x(t)]$ is used in conjunction with the probability of a phoneme sequence conditioned on a word, $P[f(t)=f_i|w]$, to get an estimate of the probability of a word. In standard speech recognition algorithms, $P[f(t)=f_i|w]$ is estimated using a lattice model. Since a variety of standard techniques can be used to create a lattice model, the problem of estimating lattice model structures or parameters is not discussed here. However, in the next section, one way to combine a lattice structure with CO-MALCOM processing to achieve speech recognition is discussed.

Combining the Word Model With a Lattice

Define variables reminiscent of the HMM forward algorithm:

$$a_{ij}=P[f(t)=f_i|f(t-1)=f_j,w] \quad \text{Eq. 18}$$

$$b_i(t)=P[f(t)=f_i|C]=P[f(t)=f_i|\hat{x}(t)] \quad \text{Eq. 19}$$

$$\pi_i=P[f(1)=f_i|w] \quad \text{Eq. 20}$$

$$\alpha_i(t)=P[f(t)=f_j|w,\hat{x}(t),\hat{x}(t-1),\hat{x}(t-2),\ldots,\hat{x}(1)] \quad \text{Eq. 21}$$

Then, $$\alpha_i(1)=b_i(1)\pi_i \quad \text{Eq. 22}$$

and $$\alpha_i(t) = b_i(t)\sum_j a_{ij}\alpha_j(t-1) \quad \text{Eq. 23}$$

Using these recursively calculated probabilities, $$P[w|C] = P[w|x(n), x(n-1), x(n-2), \ldots, x(1)] = \sum_i \alpha_i(n)P(w) \quad \text{Eq. 24}$$

The basic idea, then, is to use the sequence of input data composites to find a smooth path through the CM. Then, the smooth path is used to get the probability of each phoneme for each acoustic window. The probabilities of each phoneme conditioned on the path are then combined with the phoneme probabilities conditioned on the word and the prior word probability using Equation 24, to get an estimate of the posterior probability of the word.

PROCESS

FIGS. 1–5 illustrate speech processing in accordance with the present invention. FIG. 1 depicts the training process used to form a continuity map for processing unknown input composite speech data. Training data consist of sequences of input data composites, e.g., sequences of speech codes, such as VQ codes, and sequences of output data composites time-aligned with the input composites, e.g., sequences of phonemes, or other speech transcription symbols. The prior probabilities of the symbols in the vocabulary of the input data sequences P(c) and the output data sequences P(f) are initialized 10 to the relative frequency of the symbols in the training data.

For example, suppose a training data set is composed of two sequences and the first sequence of training data is {[12,(voiced, nasal); 57, (voiced, oral); 29, (unvoiced, nasal)]}. In this sequence, the input stream of VQ codes is [12, 57, 29] and the time-aligned sequence of output data composites is [(voiced,nasal), (voiced, oral), (unvoiced, nasal)], where VQ code 12 occurs at the same time as the first output data composite, (voiced, nasal), and VQ code 57 occurs at the same time as (voiced, oral). The output data sequence can be divided into two output data streams, [voiced, voiced, unvoiced] and [nasal, oral, nasal]. Let the second training data sequence be {[12,(voiced, nasal); 12, (voiced, oral); 29, (unvoiced, nasal)]}. Since VQ code 12 occurs 3 times out of 6 VQ codes in the training data, it is given an initial probability of 0.5. Similarly since "voiced" occurs 4 times out of the six windows of data, it is given the probability of 2/3.

Next, the PDF parameters, $\phi_c$ and $\phi_f$, are initialized 12 for the particular PDFs used to represent the input and output data on a continuity map. For example, if a Gaussian form is assummed for the PDFs, a parameter $\phi$ is a set of mean vectors and covariance matrices. Ideally, the initial $\phi_c$ values will be determined using MALCOM, and the $\phi_f$ values can be estimated from the smooth paths and the phonetic labels. Alternately, an initial parameter set can be selected using random vectors for the means and identity matrices for the covariance matrices.

A standard maximization algorithm, e.g., conjugate gradient ascent, is performed 14 to find the $\phi_c$ and $\phi_f$ values that maximize the log probability of the output data composite (the likelihood function). Standard maximization algorithms typically call subroutines that give the value of the function to be maximized at various values in the domain of the function, and another subroutine that gives the gradient of the function at values in the domain of the function. A suitable algorithm (FIG. 2) calculates 16 the likelihood function over all of the output data composite sequences using the initial values for $\phi_c$ and $\phi_f$. The gradient of the likelihood function is calculated 18 (FIG. 3) with respect both $\phi_c$ and $\phi_f$, evaluated at the current values of $\phi_c$ and $\phi_f$. New values for $\phi_c$ and $\phi_f$ are selected by the maximization algorithm 14, to maximize the log probability of the output data composite. The training data provides the input for forming the continuity map from the training data. The CM is output.

Figure 2:
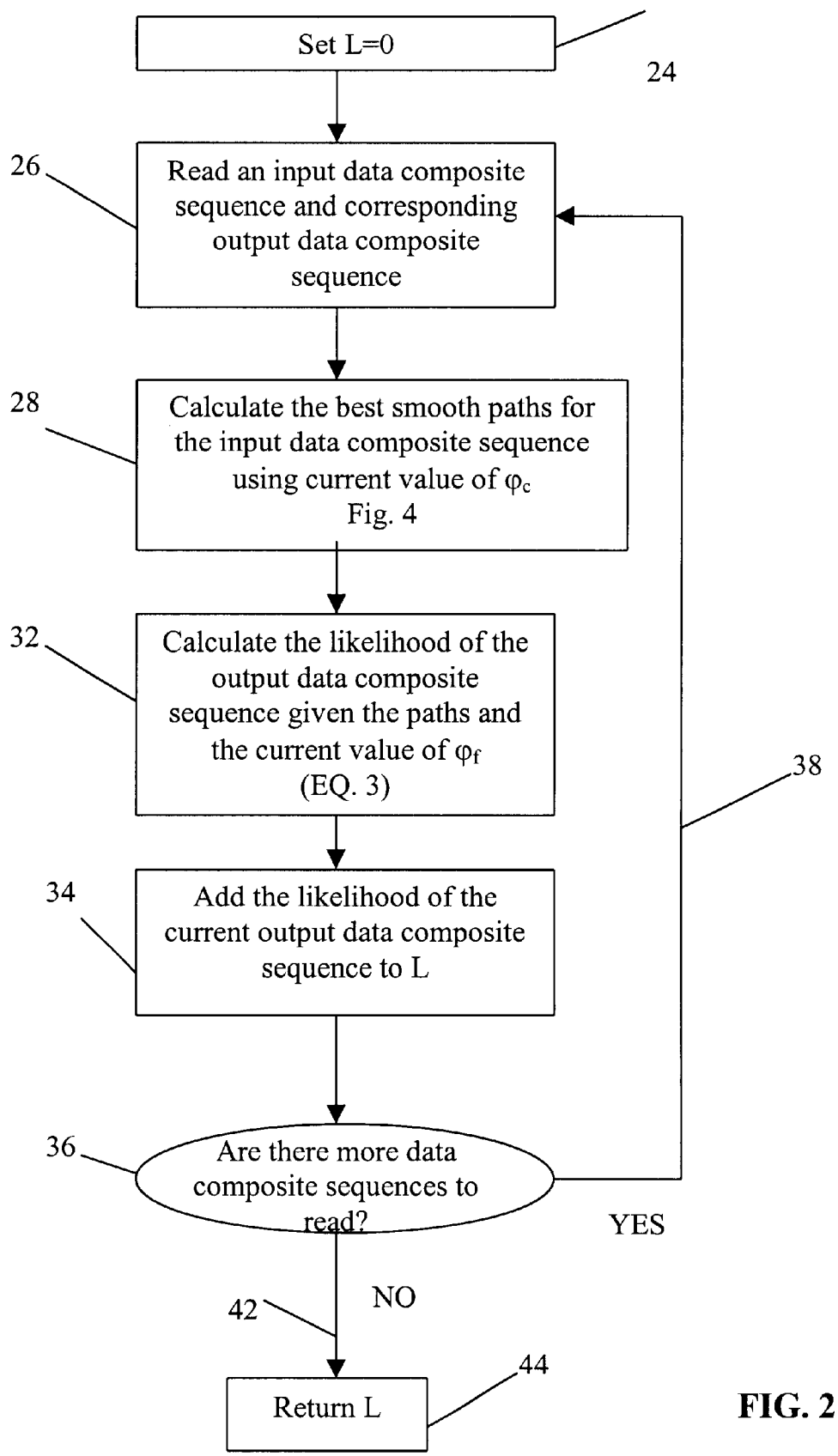
FIG. 2 is a flow diagram for computing gradients of likelihood functions.

FIG. 2 depicts the process for calculating a likelihood function from known input data composite sequences and corresponding output data composite sequences. The value of the likelihood function L is first set to zero 24. An input data composite sequence and corresponding output data composite sequence are then read 26 for processing. For example, an input data composite sequence might be a series of VQ codes, where addditional selected categorical variables might be added. An output data composite sequence might be a set of categorical variables that represent phonemes.

Figure 4:
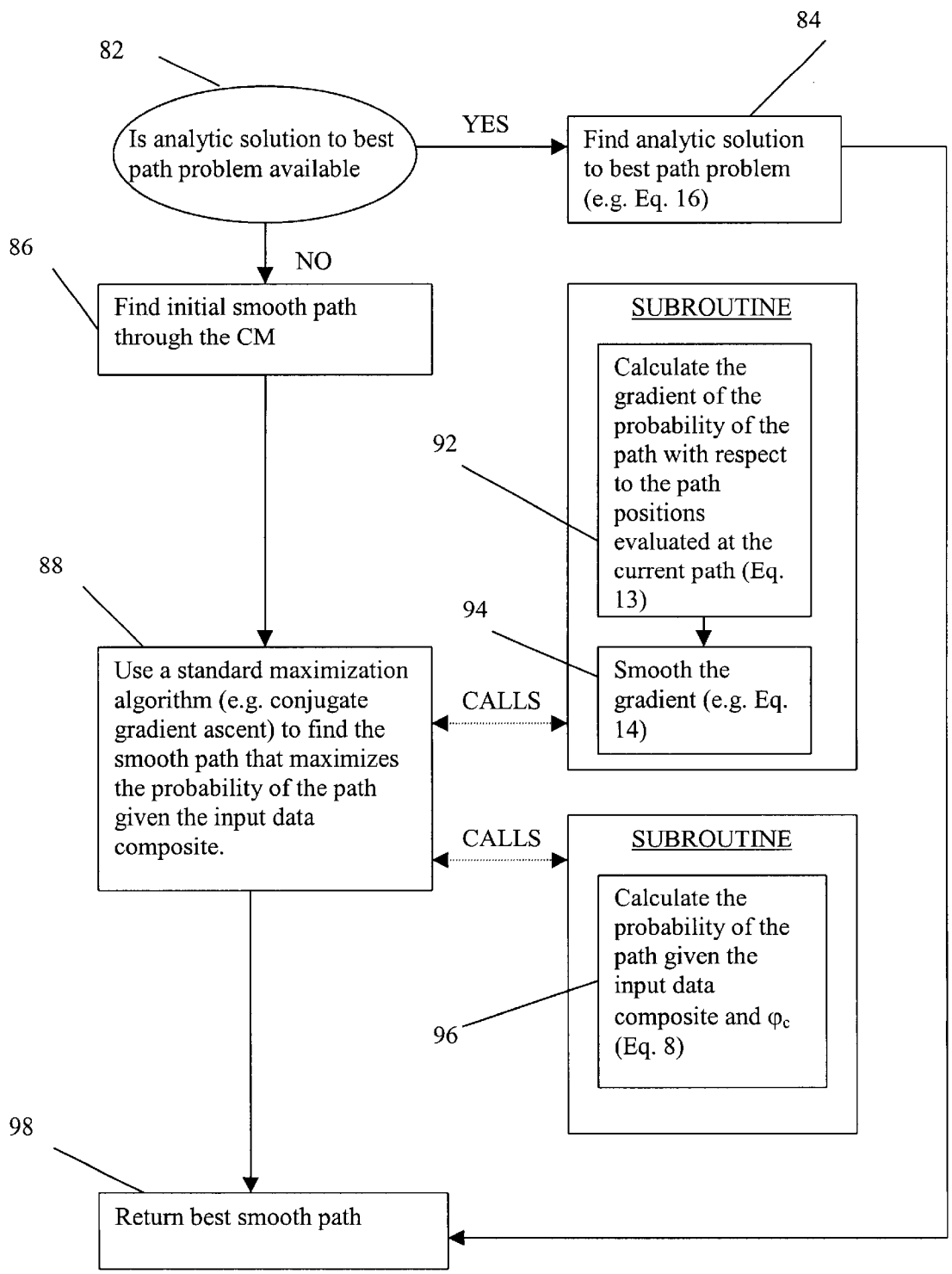
FIG. 4 is a flow diagram for a process that calculates the best smooth path on a continuity map.
Figure 5:
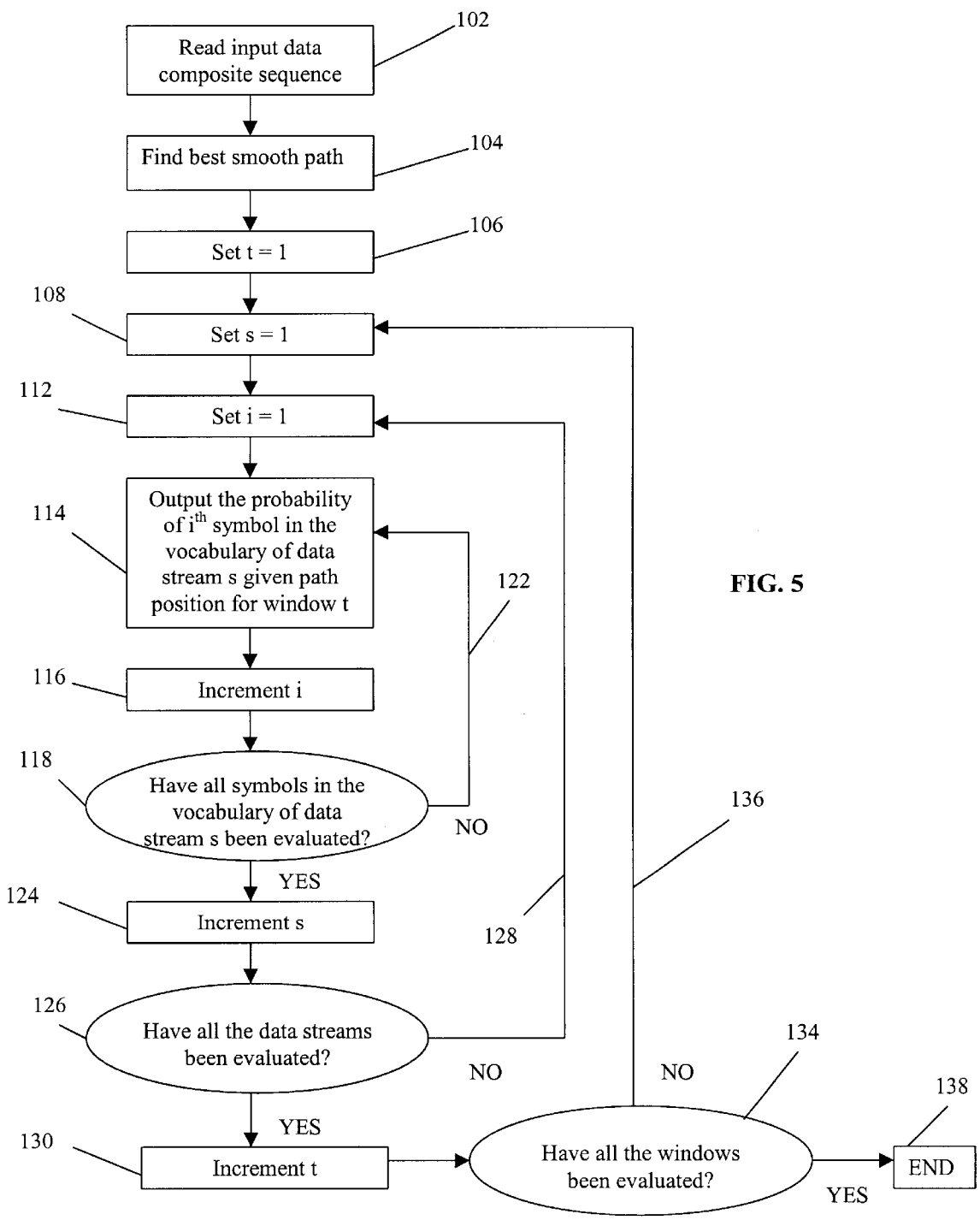
FIG. 5 is a flow diagram for computing the probabilities of output data characteristics from a new input data composite sequence given the continuity map and smooth paths from training the process.

Using the current value of $\phi_c$, the best smooth paths for the input data composite sequence is calculated 28 (FIG. 4). Then, the likelihood of the output data composite sequence is calculated 32 from Eq. 3 given the paths and the current value of $\phi_f$. The likelihood of the current output data composite sequence is added 34 to the current value of L to provide an updated value.

The process then determines 36 if there are more data composite sequences to be read. If so, the process returns 38 to read 26 the next sequence for further updating L. If the data composite sequences are all read, the value of the likelihood function L is output 44.

Figure 3:
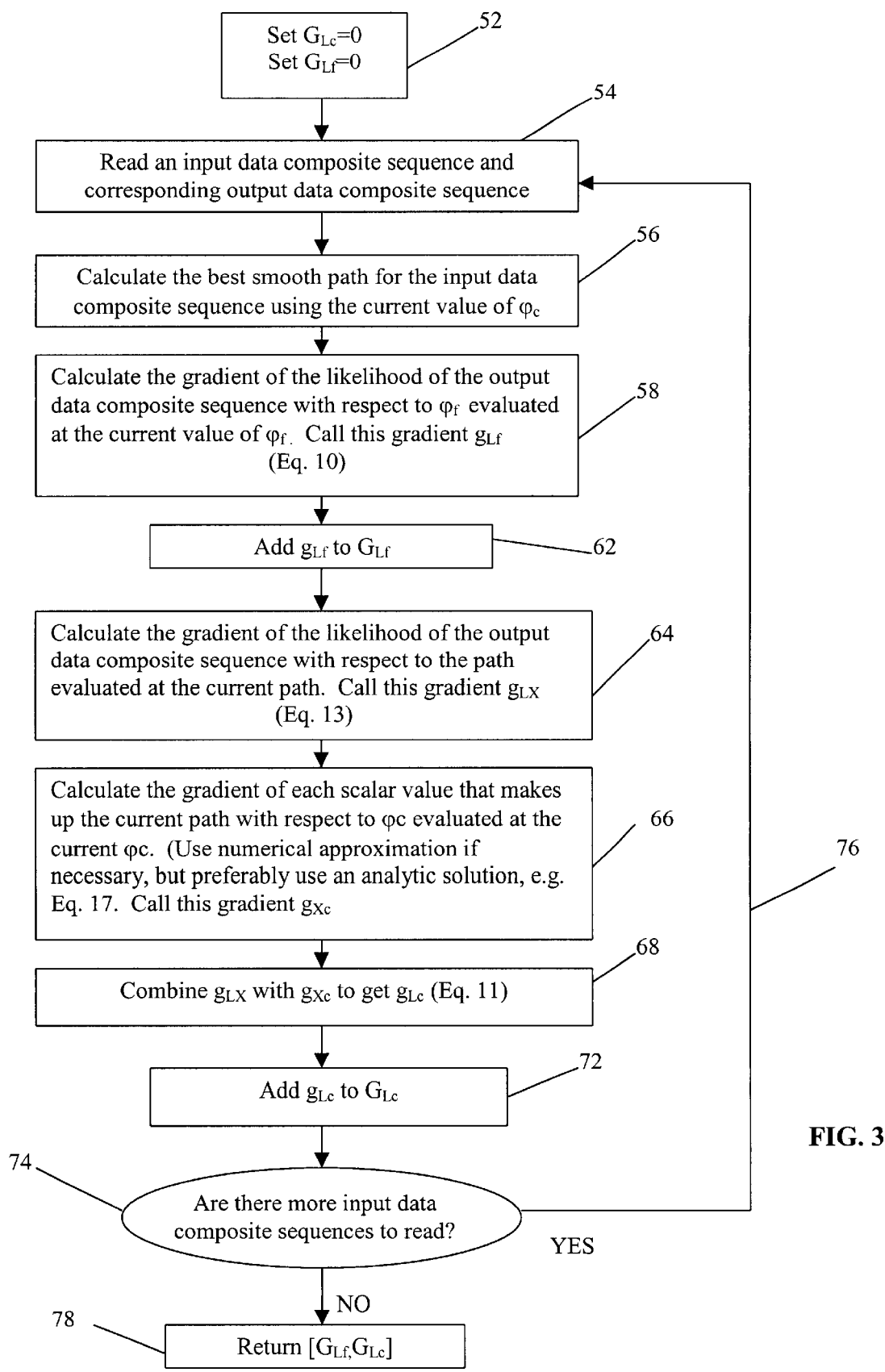
FIG. 3 is a flow diagram for calculating the likelihood function.

FIG. 3 depicts a process for calculating the gradient of the likelihood function L with respect to $\phi_c$ and $\phi_f$. The process is initiated by setting 52 the gradients $G_{L_c}$ and $G_{L_f}$ to zero. The input data composite sequence and corresponding output data composite sequence is read 54 and the best smooth path through a continuity map is calculated 56 for the input data composite sequence using the current value of $\phi_c$. The gradient of the likelihood of the output data composite sequence is calculated 58 (Eq. 10) with respect to $\phi_f$ evaluated at the current value of $\phi_f$ to output a gradient $g_{Lf}$. The gradient $g_{Lf}$ is added 62 to the current value of $G_{Lf}$, since the gradient for all sequences is the sum of the gradients for individual sequences.

Next, the gradient of the likelihood of the output data composite sequence is calculated 64 (Eq. 13) with respect to the path evaluated at the current path to output a gradient $g_{LX}$. The gradient of each scalar value that makes up the current path is calculated 66 with respect to $\phi_c$ evaluated at the current $\phi_c$. A numerical approxiation can be used if necessary, but it is preferable to use an analytic solution, e.g., Eq. 11. This gradient is output as $g_{Xc}$.

The gradient $g_{LX}$ is combined 68 with gradient $g_{Xc}$ using Eq. 11 to output $g_{Lc}$. Gradient $g_{Lc}$ is added 72 to the current value of $G_{Lc}$ to provide an updated value. The process then determines 74 if there are more input data composite sequences to read. If so, the process returns 76 to read 54 the next data sequence for processing. If there are no more data sequences, the process then outputs the values of $G_{Lc}$ and $G_{Lf}$.

FIG. 4 depicts a process for determining a best smooth path through the continuity map. The process first determines 82 if there is an analytic solution available for the best path problem. For example, for the case where the PDFs are Gaussian distributions, there is an analytic solution available. If there is an analytic solution, that analytic solution is determined 84, e.g., see Eq. 16, and the best smooth path is readily returned. If there is not an analytic solution, then an initial smooth path through the CM is found 86.

A standard maximization algorithm is used 88 (e.g., conjugate gradient ascent) to find the smooth path that maximizes the probability of the path given the input data composite. Subroutines are called that calculate 92 the gradient of the probability of the path with respect to the path positions evaluated at the current path (see Eq. 13). The gradient is smoothed 94 using Eq. 14. Also, the probability of the path is calculated 96 given the input data composite and $\phi_c$ (Eq. 8), moving along the gradient until the probability is maximized. This process is repeated until the smooth path is found that maximizes the probability of the path given the input data composite. This path is output 98 as the best smooth path.

Once the training is complete (FIGS. 1–4), a new input data composite sequence is read 102 for input and the best smooth path is found 104 through the CM established from training data. The indices for the $i^{th}$ symbol in the vocabulary of data stream, s for the data stream, and t for the time window are all set equal to 1 (process steps 106, 109, and 112). From the best smooth path (process step 104), the probability of the $i^{th}$ symbol in the vocabulary of data stream s is output 114 given the path position for window t and index i is incremented. The process determines if all symbols in the vocabulary of data stream s have been evaluated. If not, the process returns 122 to output 114 the probability for the next symbol.

When all the symbols in data stream s have been evaluated, the index s is incremented and the process determines 126 whether all the data streams have been evaluated. If not, the process returns 128 with a new data stream and the symbols in the vocabulary of that data stream are evaluated. When all of the data streams have been evaluated, the time window index t is incremented 130 and the process determines 134 whether all the windows have been evaluated. It not, the process returns 136 to reset indices s and i for the new incremented time window t. If so, the process outputs 138 the probabilities of all elements i in each data stream s over all of the time windows. The most probable output data composite can then be readily extracted or the probabilities of all the symbols in the output data composite can be used to find the most probable word.

Preliminary Experiment: Discriminating phonemes with articulator positions,

MALCOM, and MO-MALCOM

Continuity map positions inferred using MO-MALCOM (a simplification of CO_MALCOM) give much more information about phoneme identity than MALCOM or measured articulator positions.

Data

A German data set was collected during the course of dissertation work by P. Hoole at the Institute for Phonetics in Munich. The data set consists of measurements of both acoustics and articulation with accompanying time-aligned phonetic transcriptions. The complete data set contains speech from 5 male speakers and 1 female speaker. Each speaker read 108 sentences. The sentences were the same for all six speakers. Each sentence is about 4 seconds long.

The acoustics were recorded using a room-placed microphone and were originally sampled with 16 bit resolution at 16 kHz. The data was downsampled to 11025 Hz for the present experiments.

Time aligned phonetic labels were obtained using speaker-dependent hidden Markov models and corrected by hand when necessary.

Articulator measurements consist of measurements of the positions of small Electromagnetic Midsagittal Articulometer receiver coils glued to the tongue, jaw, and lips of the subjects. The receiver coil positions were measured with 16-bit resolution at 250 Hz. The articulator measurements were downsampled as necessary to make one articulator measurement for each acoustic frame, and were then low-pass filtered to remove energy above 15 Hz.

Procedure

Two speakers who were not used for tuning any model parameters were used to evaluate the phoneme discrimination power. A jackknife procedure was used on the data from these two subjects: the 108 sentences were divided into 12 groups of 9 sentences. The MALCOM and MO-MALCOM algorithms were trained on 11 of the groups of sentences and tested on the remaining group. MALCOM was trained using only the speech acoustics whereas MO-MALCOM was trained using speech acoustics and time-aligned phonetic transcriptions. The training sets were used to estimate the $p(x|f)$ PDFs using the techniques described above. After estimating distributions on the training data, both MAL-COM and MO-MALCOM continuity map paths were found using only acoustics (no phoneme labels) on the testing data.

The phoneme discrimination power of MALCOM and MO-MALCOM was also compared to the discrimination power of the actual articulator measurements, i.e., the positions of the EMMA receiver coils glued to the tongue, jaw, and lips of the subjects. To determine the phoneme discrimination ability of the measured articulator positions, the articulator positions were projected into a seven-dimensional principal component representation. The principal component subspace captures virtually all of the variance in the articulator data. Then Gaussians were found that estimated $p(x|f)$ for each phoneme, where x is a position in the principal components space.

For each pair of phonemes, Fisher's discriminate analysis was used to find the dimension of the map (either the continuity map or the principal components space) that best discriminated the phoneme pair, where the phonemes in a pair are designated $f_1$ and $f_2$. Along this best dimension, the percentage of area in common between $p(x|f_1)$ and $p(x|f_2)$ was computed. To the extent that this is a low value, the articulator positions (or pseudo-articulator positions) give a lot of information about phoneme identity. This technique for measuring the discrimination power of articulator positions was used for measured articulator data as well as MALCOM and MO-MALCOM estimates of articulator positions.

Results

While it might be expected that articulator measurements could discriminate phonemes with 100% accuracy, three facts prevent this from being the case. First, the articulator data do not contain measurements of velum position or voicing. Second, since every acoustic frame has a corresponding phonetic transcription, some of the frames that should be considered part of the transition between two phonemes will be arbitrarily labeled as being one phoneme or the other, causing an apparent loss of discrimination power. Third, the $p(x|f)$ PDFs were estimated using Gaussian functions, which may not be the ideal PDFs to use.

In fact, measured articulator positions used without acoustic information are only moderately useful for discriminating between phonemes. As should be expected, for measured articulator positions, most of the discrimination problems are between consonants that differ in voicing and nasality. For example the phonemes [p, b, m] are very difficult to discriminate (overlaps between 40% and 63% occur) based on the measured articulator data. Similarly, [t, d, n, and l] are hard to discriminate.

On the other hand, articulator positions are not very useful for discriminating between phonemes even in some cases where the phonemes differ in features other than nasality and voicing. For example, the difference between [f] and [p] is not a difference in nasality or in voicing: [f] differs from [p] in place of articulation (labio-dental vs. bilabial) and manner of articulation (fricative vs. stop). However, it is very difficult to discriminate between [f] and [p] (41% overlap) using articulator measurements. Similarly, [b] and [w] are difficult to discriminate using measured articulator positions (37% overlap) despite the fact that differences between these phonemes are not in the nasality or voicing features. Vowels are another example where articulator positions are only moderately useful for discrimination, where overlaps of 20% or more are not uncommon.

In the cases where articulation does not discriminate phonemes well, it would clearly be useful to use acoustics in conjunction with articulation measurements to discriminate the phonemes. This is what MO-MALCOM is apparently doing when it successfully discriminates phonemes that differ in place of articulation and also discriminates phonemes that differ in acoustic qualities. The ability of MO-MALCOM to differentiate between phonemes that differ in place of articulation is demonstrated by two examples: 1) the largest overlap in MO-MALCOM PDFs between phoneme pairs composed of [p], [t], and [k] is 1%; 2) the largest overlap between phoneme pairs composed of [b], [d], and [g] is 6%. The ability of MO-MALCOM to discriminate between phonemes with similar articulation but different acoustics is also evident—[b] and [p] have an overlap of less than 0.5%, [d] and [t] have an overlap of 2%, [k] and [g] have an overlap of 6%. Even [b] and [w], which articulator positions did not discriminate well, are discriminated well by MO-MALCOM positions (the overlap is less than 0.5%). Furthermore, MO-MALCOM continuity map positions are much better at discriminating vowels than articulator positions—the largest overlap for MO-MALCOM is 3% and only 6 vowel pairs have overlaps larger that 0.5%. In contrast, 63 vowel pairs have overlaps of more than 0.5% using articulator data, and 9 of those vowel pairs have overlaps of more than 20%

MO-MALCOM continuity map positions also discriminate phoneme identities more accurately than MALCOM continuity map positions. The most difficult pair of phonemes for MO-MALCOM to discriminate is [r] and [I], which have 19% overlap. The next most difficult pair is [r] and the glottal stop with a 17% overlap. The vast majority of phoneme pairs have less than a 0.5% overlap and only 7 phoneme pairs have overlaps of more than 10%. While MALCOM does somewhat better at discriminating a few phoneme pairs, in general it does worse, with some overlaps as high as 29% or 34%.

Clearly, MO-MALCOM is using both acoustic and the equivalent of articulatory information in discriminating phoneme pairs, and is doing so with a high degree of accuracy, particularly considering the small training set size.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method for speech recognition comprising the steps of:
   (a) initializing parameters of first probability density functions mapping between the symbols in the vocabulary of one or more input sequences of speech codes that represent speech sounds and a continuity map;
   (b) initializing parameters of second probability density functions mapping between the elements in the vocabulary of one or more sequences of speech transcription symbols, where the speech transcription symbols are time aligned with the input speech codes, and the continuity map;
   (c) training the parameters of the probability density functions,
   (d) inputting a new sequence of speech codes;
   (e) identifying a smooth path on the continuity map having the maximum probability for the new sequence of speech codes; and
   (f) outputting the probability of each speech transcription symbol for each input speech code.

2. A method according to claim 1, wherein the step of training the parameters of the probability density functions comprises the steps of:
   (a1) inputting a set of training data comprising sequences of speech codes and sequences of speech transcription symbols;
   (a2) finding a smooth path through the continuity map that maximizes the conditional probability of the path for each sequence of speech codes;
   (a3) given the training data and smooth paths, adjusting the parameters of the first and second probability density functions to increase the conditional probability of the sequences of speech transcription symbols;
   (a4) repeating steps a1 through a3 to maximize the probability of the sequences of speech transcription symbols.

3. A method according to claim 1, wherein the speech codes are VQ codes.

4. A method according to claim 1, wherein the speech transcription symbols are phonemes.

5. A computer implemented method for determining word characteristics comprising the steps of:
   (a) initializing parameters of first probability density functions mapping between input words and a continuity map;
   (b) initializing parameters of second probability density functions mapping between output word characteristics, where the word characteristics are time aligned with the input words, and a continuity map;
   (c) training the parameters of the first and second probability density functions;
   (d) inputting a new sequence of words;
   (e) identifying a smooth path on the continuity map having a maximum probability for the new sequence words; and
   (f) outputting the probability of each word characteristic for each word.

6. A method according to claim 5, wherein the step of training the parameters of the first and second probability density functions comprises the steps of:
   (a1) inputting a set of training data comprising sequences of words and word characteristics;
   (a2) finding a smooth path through the continuity map that maximizes the conditional probability of the path for each sequence of words;
   (a3) given the training data and smooth paths for each sequence of words adjusting the parameters of the first and second probability density functions to increase the conditional probability of the sequences of word characteristics;
   (a4) repeating steps a1 through a3 to maximize the probability of the sequences of the word characteristics.

* * * * *